A. N. CHENOWETH.
AUTOMATIC GEAR SHIFT FOR AUTOMOBILES.
APPLICATION FILED DEC. 8, 1914.

1,213,794.

Patented Jan. 23, 1917.
4 SHEETS—SHEET 3.

Witnesses:
John E. Prager
A. Worden Gibbs

Inventor
Arthur N. Chenoweth
By his Attorney
Fredk F. Schuetz

UNITED STATES PATENT OFFICE.

ARTHUR N. CHENOWETH, OF WATERBURY, CONNECTICUT.

AUTOMATIC GEAR-SHIFT FOR AUTOMOBILES.

1,213,794.　　　　　Specification of Letters Patent.　　Patented Jan. 23, 1917.

Application filed December 8, 1914.　Serial No. 876,040.

*To all whom it may concern:*

Be it known that I, ARTHUR N. CHENOWETH, a citizen of the United States, and a resident of Waterbury, in the county of New Haven and State of Connecticut, have invented certain new and useful Improvements in Automatic Gear-Shifts for Automobiles, of which the following is a specification.

The invention relates to improvements in electric gear changing mechanism for automobiles; and it has for its object to provide means whereby the sliding gears of the automobile transmission may be automatically shifted in accordance with the speed at which the automobile is traveling, the particular gears to be meshed being automatically selected through means controlled by the speed of the automobile and, therefore, selected independently of the speed of its motor.

The invention has for a further object to provide mechanical means in connection with the aforesaid speed controlled means whereby the desired transmission gears may be manually selected and independently of the automatic speed control, should the latter for any reason fail, or to permit of engagement of a particular set as for example the low gear set when approaching a hill which it is known cannot be climbed on high gear. Moreover, means are provided whereby, in connection with the throttle lever and after the gears have been meshed for highest speed, the said gears may be maintained in this position though the automobile be run at low speeds.

In carrying out the invention, I employ a plurality of solenoids to shift the gears—one solenoid for each of the desired speeds, for example, first, second and third ahead and one speed reverse. A neutral solenoid is also provided to return the transmission gears to the neutral position before shifting to a different speed; and a further solenoid is adapted to release the engine clutch. Means depending upon the speed of the automobile, as for example, a centrifugal governor operated from the driven shaft, are designed to control electrical connections of circuits to the various speed changing solenoids to effect the energization of a particular solenoid as the corresponding speed is attained by the vehicle.

The nature of the invention will be best understood when described in connection with the accompanying drawings, in which—

Similar characters of reference designate corresponding parts throughout the several views.

Figures 1, 2:
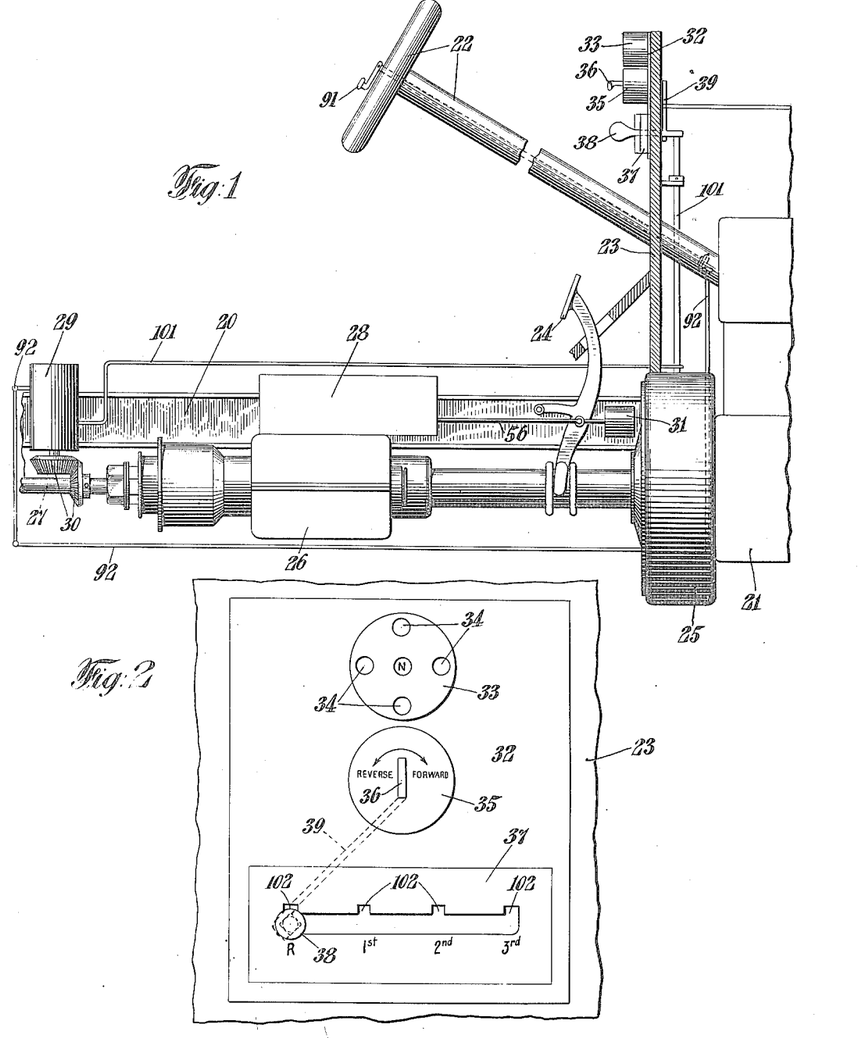
Figure 1 is a side elevation, partly in section of a portion of an automobile frame and mechanism, and illustrates the general arrangement of parts in carrying out the invention.
Fig. 2 is a fragmentary detail view of the control panel.

Referring to the drawings, more particularly to Figs. 1 and 2 thereof, 20 designates a suitable frame of an automobile of which a portion of the engine 21 is shown as well as the steering wheel and post 22, the dashboard 23, clutch pedal 24, clutch 25 and transmission casing 26, and driven shaft 27. In addition to the foregoing, there is provided a casing 28 containing the various controlling solenoids hereinafter referred to and which is mounted upon the transmission casing 26; also, a casing 29 containing the governor for controlling the solenoids, the said casing being attached to frame 20 and the governor being operated from the driven shaft 27 through suitable bevel gears 30. The clutch 25 is spring actuated for engagement and is provided, furthermore, with a checking cylinder 31 as is well understood.

Mounted on the dash-board 23 conveniently to the operator is the panel 32 carrying a magnetic indicator 33 of well-known construction and which is provided with suitable apertures 34 through which a visual indication is afforded of the particular set of transmission gears in mesh. There is also mounted on the panel the starting switch 35 adapted to receive a key 36 by the turning of which the vehicle may be started to move either in the forward or reverse direction. Below the same is located the manual control 37 which is provided with operating handle 38 for the various speeds, the said control being interlocked, as by means of an arm 39 whose end is turned over to engage the handle 38, to the said starting means 35. It will thus not be possible to start the vehicle manually or electrically until the key has been inserted and turned in the desired position.

In the solenoid casing 28 there are located six solenoids, Figs. 3 to 6, four of which are mounted as two oppositely disposed pairs, each pair having a common plunger rod. Of these solenoids, the solenoid 50 is adapted to control the reverse gearing, the solenoid 51 the gearing for slow or first speed forward, the solenoid 52 the gearing for medium or second speed forward and the solenoid 53 the gearing for fast or third speed forward. In addition to the aforesaid solenoids, there is mounted above and between the solenoids 51 and 53 a solenoid 54 which is adapted to restore the various transmission gears in the casing 26 to the neutral or non-meshing position. A solenoid 55 mounted within the casing 28 is adapted to control the clutch 25, being connected to the clutch pedal 24 through rod 56.

60 designates the common plunger rod of the solenoids 50 and 51, and 61 the common plunger rod of the solenoids 52 and 53. The plunger rod 62 of the neutral solenoid 54 is arranged to extend between and above the two rods 60 and 61, and through an arm 63 is adapted to rock a shaft 64 suitably mounted and carrying reversely curved or S-shaped arms 65 and 66 at its opposite ends. Extending inwardly from the rods 60 and 61 are U-shaped members 67 and 68 respectively and with which the corresponding arms 65 and 66 are adapted to co-act to restore the corresponding plunger rods 60 and 61 to a neutral position whenever the neutral solenoid is energized and its rod 62 thereby drawn inwardly; or, to withdraw the rod 62 when the gear shifting solenoids are energized. The various solenoids are provided with suitable check valves 69 to cushion the action of their plungers and thereby retard the impact of the gears. The impact or throw of the gears is further cushioned, before the end of travel, by the well-known centering action of a solenoid coil.

Figure 3:
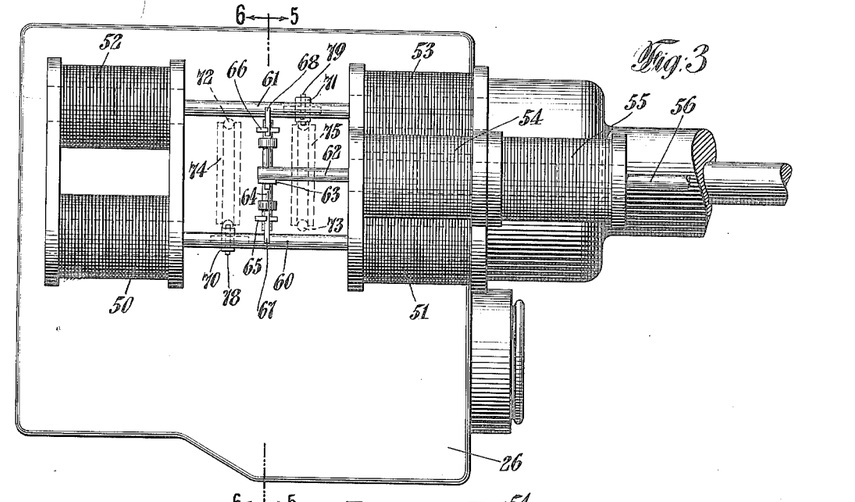
Fig. 3 is a plan of the gear shifting solenoids and also of the clutch solenoid.
Figure 4:
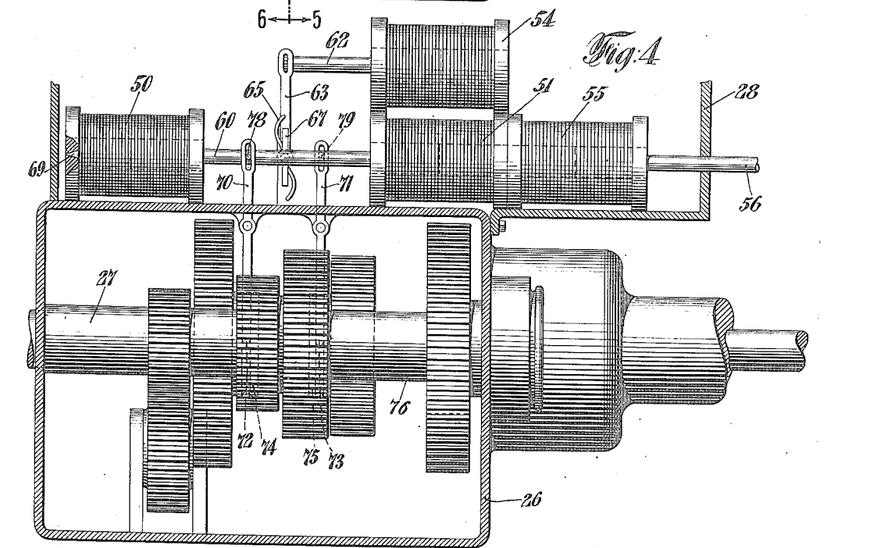
Fig. 4 is a side elevation of the same and of the transmission gearing.
Figure 5:
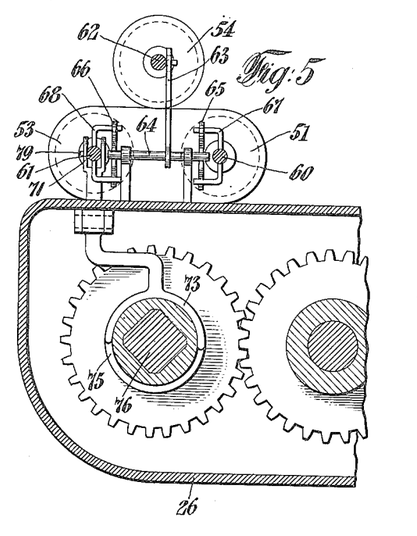
Figs. 5 and 6 are vertical sections taken on the line 6—5, Fig. 3, looking respectively in the direction of the arrows.
Figure 6:
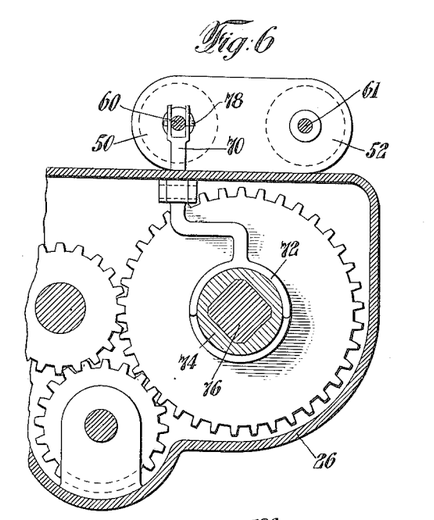

The gearing for the various speeds is shifted in well-known manner under the action of the solenoids through respective levers 70 and 71 provided at one end with forks 72 and 73 respectively to fit suitable collars 74 and 75 on the shaft 76 of the transmission gears. The other ends of the levers 70 and 71 are slotted and are adapted to receive pins 78 and 79 extending from the respective rods 60 and 61, whereby the levers are accordingly actuated as the corresponding solenoid is energized and as will be hereinafter more fully set forth.

Figures 7, 8, 9, 10:
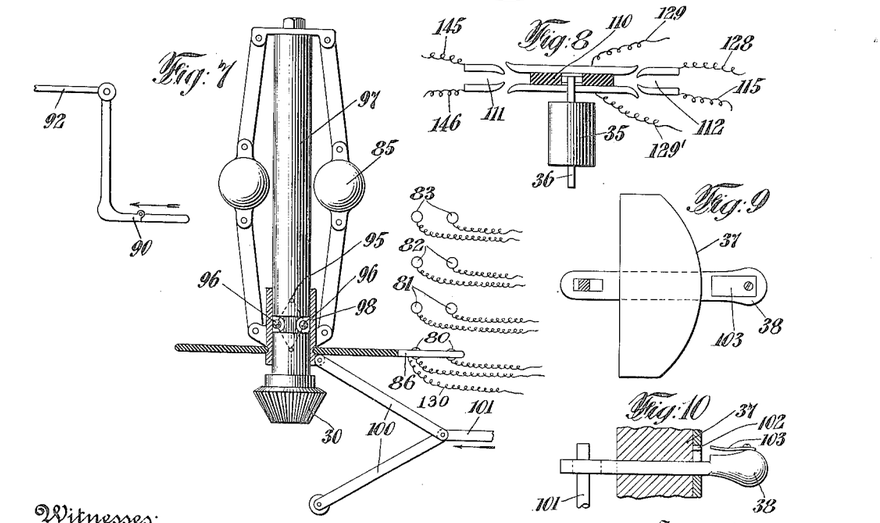
Fig. 7 is a detail view of the governor mechanism.
Fig. 8 is a detail view of the starting switch and lock.
Figs. 9 and 10 are detail fragmentary views respectively in plan and vertical section of the operating handle and locking means for the manual control.

To effect the energization of the solenoids to connect the desired transmission gears, suitable means controlled by the speed of the vehicle are employed to close electrical contacts 80, 81, 82 and 83 corresponding to the various speeds, to wit—reverse, first speed, second speed and third speed forward respectively. A centrifugal governor 85 may be employed for this purpose and is designed to move a contact arm 86 to bridge the aforesaid contacts in accordance with the speed of the vehicle; and the same is driven from the driven shaft 27 through the bevel gears 30. Contact arm 86, moreover, when in the position to bridge the contacts 83 for the high speed transmission gearing, is adapted to be engaged by a locking arm 90 whose motion is controlled from the throttle lever 91 through suitable intermediate connections 92. The motion of arm 90 is so controlled that in closing the throttle after building up the transmission gearing to the third speed condition it will move (in the direction indicated by the arrow) to a position beneath the said contact arm 86 and thus prevent its return, notwithstanding the fact that the vehicle speed has diminished. Arm 90 is designed, moreover, to permit the arm 86 to wipe past it in the direction for increased speed, but prevents the return thereof when moved beneath the same. It will thus be possible to drive the vehicle on high speed gearing at slow rates of speed, but it is understood that it is first necessary to build up, automatically or manually and as will be hereinafter set forth, to the high speed position. The governor 85 is provided, furthermore, with an auxiliary governor 95, the balls 96 of which, when the governors are at rest, lie within the main governor shaft 97 and flush with its periphery, being partly covered by a sleeve 98 surrounding said shaft 97 and fixedly secured to the governor and contact arm 86. This auxiliary governor is designed to prevent the return of the contact arm 86 below the contacts 81, by the balls 96 of the said auxiliary governor moving out beneath the sleeve 98, thereby making it impossible to intentionally or accidentally close the reverse gear contacts and engage said reverse gears while the vehicle is in motion. This condition will obtain under manual as well as automatic control conditions.

Sleeve 98 and thereby the contact arm 86 is also designed to be manually moved to effect the bridging of the various contacts. To this end, there is attached to the same one arm of a toggle device 100 which is adapted to be actuated from the handle 38 through suitable intermediate connections 101. By moving handle 38 to the desired position as indicated upon the control 37 and locking it in the corresponding notch 102 for the particular speed, for example by pushing inwardly the said handle while temporarily depressing a spring locking member 103 thereon, the contact arm 86 will be moved to and locked across the particular contacts selected and the corresponding transmission gears maintained in mesh. It will be understood that when the handle 38 is not locked in one of the notches 102, it will partake of the motion of the contact arm 86 and may thus serve as an indicator of the particular transmission gears in mesh.

To start the vehicle either in reverse or first speed forward direction, the key 36 is inserted into the lock 35 to operate a starting, two-way switch 110 (Fig. 8) having a pair of contacts 111 and a pair of contacts 112 for each throw of the switch in accordance with the desired direction of the vehicle, the contacts 111 corresponding to the reverse and contacts 112 to the forward direction. When the vehicle is at rest, the contact arm 86 bridges the contacts 80; and in turning the said key 36 to operate switch 110, one side of a battery 113, (Fig. 11) grounded on the other side at 114, is connected through said contact arm 86 with the contacts 80 and with the said switch 110. Accordingly as the said switch 110 is thrown, one pole of the battery 113 will be connected either to the contacts 111 or 112. Assuming, that the switch 110 has been thrown to make connection with contacts 112 and which is the condition for first speed forward, the circuit may be traced as follows: through the lead 115 to the contact 116 which is adapted to be operated by the motion of the solenoid rod 60 to be maintained in closed position when the solenoid 51 is not energized. Similar switches are provided for each of the three other solenoids 50, 52 and 53 and are similarly maintained closed so long as their respective solenoids are not energized, but are adapted to be opened upon the said solenoids being energized. When this occurs, corresponding contacts 117 are adapted to be closed. The actuation of these switches through the movement of the solenoid rods is well understood in the art and need not be further described. From the contact 116, the circuit is through the common lead 120, through the clutch solenoid 55 and lead 121 to the other side of the battery 113. This effects the energization of clutch solenoid 55 throwing out the clutch 25 and causing the clutch solenoid plunger 56 to close contact 122, connecting thereby through lead 123 and the contact 124 of the neutral solenoid 54 one side of the battery 113 with said solenoid 54, the other side being connected through lead 125 to the other side of the battery 113. The circuit to the neutral solenoid 54 is thus completed and, if the transmission gears are not already in their neutral non-meshing position, the same will be drawn into this position through the action of one or the other of the S-shaped arms 65 or 66 and U-shaped members 67 or 68. In energizing solenoid 54, however, the motion of its plunger opens the solenoid circuit at the contract 124 to deënergize said solenoid, but closes a contact 126 whereby a new circuit is established from battery 113, through lead 121, switch 122, lead 123 and lead 127 to the first speed forward solenoid 51, thence through the same and lead 128 to one side of contacts 112 of switch 110 and through the lead 129 and contacts 80, contact arm 86 and lead 130 to the other side of the battery. Solenoid 51 is thereby energized, drawing the gears into position for first speed forward and breaking the circuit for said solenoid at contact 116; and opens also thereby the clutch solenoid circuit which releases the spring actuated clutch 25 to throw the same into engagement. At the same time, the contact is closed at 117 and current from the battery 113 flows through lead 130, arm 86, contacts 81 to which the said arm has in the meantime been moved by the governor, through leads 131 and 115, the contact 117 through lead 132 to the indicating magnet 133 controlling the first speed indication, and finally through a common return 134 grounded at 135. Similar indicating circuits are established through the various contacts 117 of the different solenoids, as the latter are energized, to corresponding magnets 136, 137 and 138 for affording the proper indication, the circuits being readily traceable on the wiring diagram.

Figure 11:
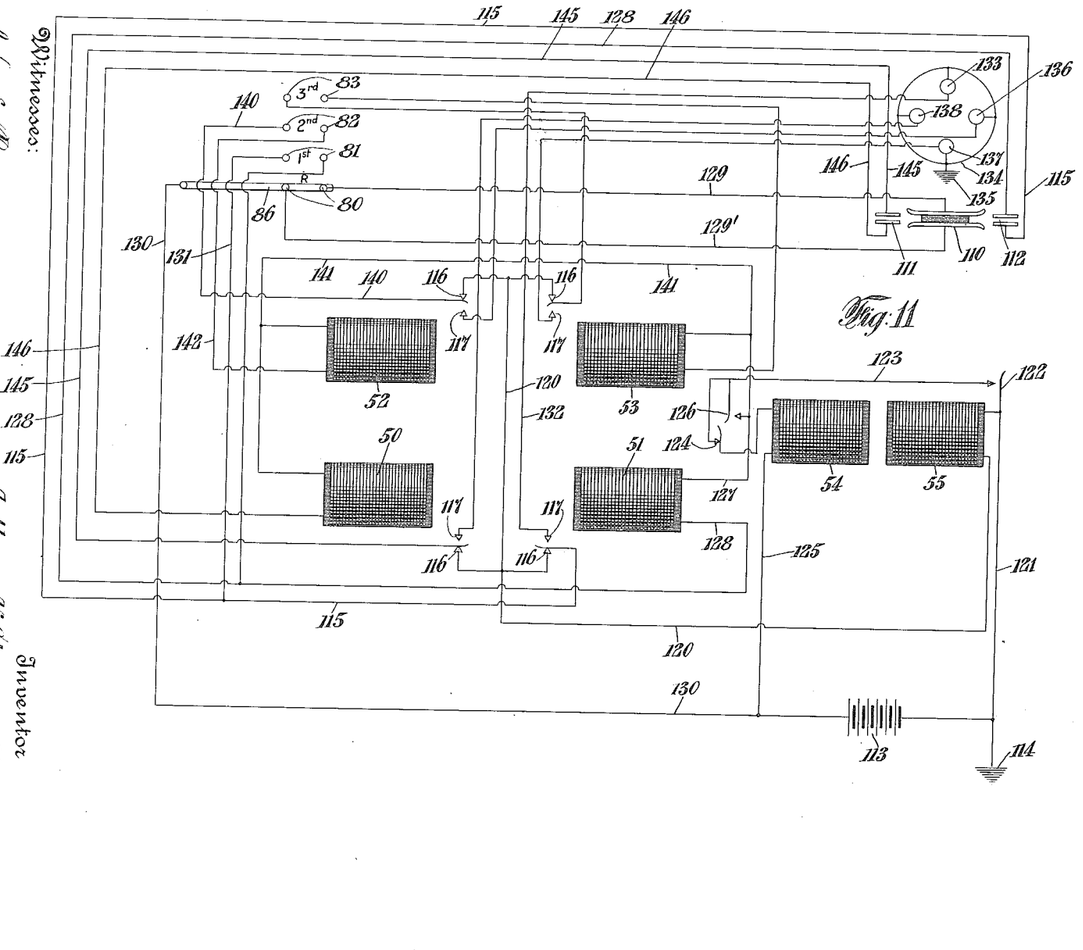
Fig. 11 is a wiring diagram of the electrical connection involved.

As the speed of the vehicle increases, contact arm 86 will bridge the contacts 82 and establishes the following circuit: battery 113, lead 130, contact arm 86, contacts 82, lead 140 through contact 116 of solenoid 52, common lead 120, through clutch solenoid 55 and lead 121 back to the battery. This energizes the clutch solenoid 55 as before to throw out the clutch 25 and closes the contact 122 to effect the energization of neutral solenoid 54 whose plunger had been returned to the energized position of the solenoid by the action of solenoid 51 through its plunger rod 60 and the S-shaped member 65 and U-shaped member 67. The said solenoid 54 thereby again restores the transmission gears to neutral position. At the same time contact 126 will be closed and an energizing circuit for the solenoid 52 established from battery 113 through lead 121, contact 122, lead 123, contact 126, lead 141, through solenoid 52, lead 142 to contacts 82 and through arm 86 and lead 130 back to the battery. The solenoid 52 then throws the gears into position for the second speed forward and operates the various switches as hereinbefore set forth in connection with the first speed forward control. The action for the third speed forward is similar to that for the second speed forward and may be readily traced upon the wiring diagram. For reversing, the switch 110 is thrown to the contact 111 and the circuit is from battery 113 through lead 130, arm 86, contacts 80, switch 110, one of the contacts 111 and lead 145 to the contact 116 of solenoid 50, thence through the common lead 120 to clutch solenoid 55 and through lead 121 back to the battery 113. Solenoid 50 is then energized through the closing of switches 122 and 126, the current passing through lead 141 and lead 146 to the other of the contacts 111 and lead 129″, contacts 80 and arm 86, through lead 130 back to the battery 113.

As hereinbefore set forth, the movement of handle 38 may serve as an indicator, except of course when the same is locked in one of the notches 102 and the magnetic indicator 33 may be dispensed with, if desired. It will be noted, furthermore, that with the exception of the said magnetic indicator, electricity is consumed only during the actual shifting operation of the gearing and the apparatus is, therefore, very economical in the consumption of electricity.

I claim:—

1. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; and a switch device to initiate the action of the automatic means to render possible the automatic shifting of said change gears.

2. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; and a switch device to initiate the action of the automatic means to render possible the automatic shifting of said change gears, and comprising a lock and key and an electric circuit adapted to be closed by turning said key.

3. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; and a switch device to initiate and render possible the automatic shifting of said change gears, and comprising a lock and key and an electric circuit adapted to be closed when the key is turned in one direction, and an electric circuit adapted to be closed when the key is turned in the reverse direction.

4. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; a switch device to initiate the action of the automatic means to render possible the automatic shifting of said change gears; and manually operated means to select the change gears for a desired speed.

5. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; a switch device to initiate the action of the automatic means to render possible the automatic shifting of said change gears; and manually operated means to select the change gears for a desired speed, said manually operated means being interlocked with said switch device, whereby the former is not operative independently of the latter.

6. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; a switch device to initiate the action of the automatic means to render possible the automatic shifting of said change gears; and means to afford visual indication of the particular change gears in action.

7. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; automatic means to govern the actuation of said electro-magnetic means; a switch device to initiate the action of the automatic means to render possible the automatic shifting of said change gears; and electro-magnetic means to afford visual indication of the particular change gears in action.

8. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the automobile clutch, and electro-magnetic means to control said clutch and disengage the same prior to a shift of the change gears; and a switch device to initiate and render possible the automatic shifting of said change gears.

9. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; means controlled by the speed of the automobile to close the circuit to a particular electro-magnetic means; and a switch device to initiate and render possible the automatic shifting of said change gears in accordance with the speed of the automobile.

10. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; centrifugal means controlled by the speed of the automobile to close the circuit to a particular electro-magnetic means; and a switch device to initiate and render possible the automatic shifting of said change gears in accordance with the speed of the automobile.

11. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile, and centrifugal means geared thereto to close the circuit to a particular electro-magnetic means; and a switch device to initiate and render possible the automatic shifting of said change gears in accordance with the speed of the automobile.

12. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; means controlled by the speed of the automobile to close the circuit to a particular electro-magnetic means; a switch device to initiate and render possible the automatic shifting of said change gears in accordance with the speed of the automobile; and means to lock said speed controlled means after the same has attained a position for effecting engagement of the highest speed change gears.

13. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; means controlled by the speed of the automobile to close the circuit to a particular electro-magnetic means; a switch device to initiate and render possible the automatic shifting of said change gears in accordance with the speed of the automobile; the automobile throttle lever; and means controlled by the same to lock said speed controlled means after the latter has attained a position for effecting engagement of the highest speed change gears.

14. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; means controlled by the speed of the automobile to close the circuit to the slowest speed electro-magnetic means first and, successively, to the electro-magnetic means for the higher speed change gears; means to prevent the return of said speed controlled means to a position beyond that for the said slowest speed circuit until the automobile has entirely stopped; and a switch device to initiate and render possible the automatic shifting of said change gears in accordance with the speed of the automobile.

15. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and adapted to close the circuit to the slowest speed electro-magnetic means first and, successively, to the electro-magnetic means for the higher speed change gears; auxiliary centrifugal means carried by said first-named centrifugal means adapted to prevent the action of the latter for a position beyond that for the slowest speed circuit until the automobile has entirely stopped; and a switch device to initiate and render possible the automatic shifting of said change gears in accordance with the speed of the automobile.

16. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and including a movable collar and contact arm, the latter being adapted to close the circuit to the slowest speed electro-magnetic means first and, successively, to the electro-magnetic means for the higher speed change gears; auxiliary centrifugal means adapted to prevent the return of said collar to a position beyond that for the slowest speed circuit until the automobile has entirely stopped; and a switch device to initiate and render possible the automatic shifting of said change gears in accordance with the speed of the automobile.

17. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and including a contact arm, adapted to close the circuit to the slowest speed electro-magnetic means first and, successively, to the electro-magnetic means for the higher speed change gears; manually operated means to move said contact arm; and a switch device to initiate and render possible the automatic shifting of said change gears in accordance with the speed of the automobile.

18. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and including a movable collar and contact arm, the latter being adapted to close the circuit to the slowest speed electro-magnetic means first and, successively, to the electro-magnetic means for the higher speed change gears; a toggle device connected with said collar, and an operating lever therefor; and a switch device to initiate and render possible the automatic shifting of said change gears in accordance with the speed of the automobile.

19. Automatic speed gear change mechanism for automobiles, comprising suitable change gears, and shifters therefor; electro-magnetic means for positioning the shifters to effect a particular engagement, and electro-magnetic means for positioning the shifters in neutral position, circuits to said electro-magnetic means and including a source of current; the driven shaft of the automobile; centrifugal means geared thereto and including a movable collar and contact arm, the latter being adapted to close the circuit to the slowest speed electro-magnetic means first and, successively, to the electro-magnetic means for the higher speed change gears; a toggle device connected with said collar, and an operating lever therefor; means to lock said operating lever in position to cause said contact arm to close the circuit for a particular electro-magnetic means; and a switch device to initiate and render possible the automatic shifting of said change gears in accordance with the speed of the automobile.

20. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and including a movable collar and contact arm, the latter being adapted to close the circuit to the slowest speed electro-magnetic means first and, successively, to the electro-magnetic means for the higher speed change gears; a toggle device connected with said collar; and an operating lever therefor; means to lock said operating lever in position to cause said contact arm to close the circuit for a particular electro-magnetic means; a switch device to initiate and render possible the automatic shifting of said change gears in accordance with the speed of the vehicle; and a lever operated thereby adapted to control the said toggle operating lever.

21. Automatic speed gear change mechanism for automobiles, comprising suitable change gears, and shifters therefor; electro-magnetic means for positioning the shifters to effect a particular engagement, and electro-magnetic means for positioning the shifters in neutral position; circuits to said electro-magnetic means and including a source of current; the driven shaft of the automobile; centrifugal means geared thereto and including a movable collar and contact arm, the latter being adapted to close the circuit to the slowest speed electro-magnetic means first, and, successively, to the electro-magnetic means for the higher speed change gears; the automobile throttle lever; an arm operated therefrom adapted to be moved into the path of said collar to retain the same in position for maintaining the engagement of the highest speed electro-magnetic means after the change gears for this speed have been brought into action; and a switch device to initiate and render possible the automatic shifting of said change gears in accordance with the speed of the automobile.

22. Automatic speed gear change mechanism for automobiles, comprising suitable change gears; a solenoid adapted to control the gears for reverse speed, a solenoid adapted to control the gears for first speed forward, said solenoids having a common plunger; a solenoid adapted to control the change gears for second speed forward, and a solenoid adapted to control the change gears for the third speed forward, said solenoids having a common plunger; gear shifters actuated by the respective plungers; a solenoid, and means actuated by the same to move said plungers and restore the change gears to a neutral position; suitable circuits to the said solenoids and including a source of current; automatic means to govern the actuation of said solenoids; a switch device to initiate the action of the automatic means to render possible the automatic shifting of said change gears.

23. Automatic speed gear change mechanism for automobiles, comprising suitable change gears; a solenoid adapted to control the gears for reverse speed, a solenoid adapted to control the gears for first speed forward, said solenoids having a common plunger; a solenoid adapted to control the change gears for second speed forward, and a solenoid adapted to control the change gears for the third speed forward, said solenoids having a common plunger; gear shifters actuated by the respective plungers; a solenoid, and means actuated by the same to move said plungers and restore the change gears to a neutral position; the automobile clutch, and a solenoid having a plunger connected thereto; circuits to said solenoids and including a source of current; automatic means to govern the actuation of said solenoids; a switch device to initiate the action of the automatic means to render possible the automatic shifting of said change gears.

24. Automatic speed gear change mechanism for automobiles, comprising suitable change gears; a solenoid adapted to control the gears for reverse speed, a solenoid adapted to control the gears for first speed forward, said solenoids having a common plunger; a solenoid adapted to control the change gears for second speed forward, and a solenoid adapted to control the change gears for the third speed forward, said solenoids having a common plunger; gear shifters actuated by the respective plungers; a solenoid, and means actuated by the same to move said plungers and restore the change gears to a neutral position; the automobile clutch, and a solenoid having a plunger connected thereto; circuits to said solenoids and including a source of current; and a switch device adapted to first close the circuit to energize the said clutch solenoid to disengage the clutch, then the solenoid to restore the change gears to neutral position and finally the solenoid adapted to effect the engagement of the first speed forward change gears or the reverse speed change gears, thereby opening the circuit of the clutch solenoid to permit the clutch to become engaged.

25. Automatic speed gear change mechanism for automobiles, comprising suitable change gears; a solenoid adapted to control the gears for reverse speed, a solenoid adapted to control the gears for first speed forward, said solenoids having a common plunger; a solenoid adapted to control the change gears for second speed forward, and a solenoid adapted to control the change gears for the third speed forward, said solenoids having a common plunger; gear shifters actuated by the respective plungers; a solenoid, and means actuated by the same to move said plungers and restore the change gears to a neutral position; the automobile clutch, and a solenoid having a plunger connected thereto; circuits to said solenoids and including a source of current; the driven shaft of the automobile; centrifugal means geared thereto and adapted to first close the circuit to the solenoids for reverse speed and first speed forward, then the circuit to the solenoid for the second speed forward and finally the circuit to the solenoid for the third speed forward; and a switch device adapted to close the circuit to first energize the said clutch solenoid to disengage the clutch, then the solenoid to restore the change gears to neutral position and finally the solenoid adapted to effect the engagement of the first speed forward change gears or the reverse speed change gears, thereby opening the circuit of the clutch solenoid to permit the clutch to become engaged.

Signed at New York in the county of New York, and State of New York, this 5th day of December, A. D. 1914.

ARTHUR N. CHENOWETH.

Witnesses:
    FRED'K F. SCHUETZ,
    WALTER L. POST.